US010866106B2

(12) United States Patent
Arakawa

(10) Patent No.: US 10,866,106 B2
(45) Date of Patent: Dec. 15, 2020

(54) DRIVERLESS TRANSPORTATION SYSTEM

(71) Applicant: TOYOTA JIDOSHA KABUSHIKI KAISHA, Toyota (JP)

(72) Inventor: Seiji Arakawa, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 16/132,695

(22) Filed: Sep. 17, 2018

(65) Prior Publication Data

US 2019/0086222 A1 Mar. 21, 2019

(30) Foreign Application Priority Data

Sep. 19, 2017 (JP) .................................. 2017-178762

(51) Int. Cl.
| | |
|---|---|
| *G01C 21/34* | (2006.01) |
| *G05D 1/00* | (2006.01) |
| *G05D 1/02* | (2020.01) |
| *G08G 1/00* | (2006.01) |
| *G06Q 10/02* | (2012.01) |

(52) U.S. Cl.
CPC ..... *G01C 21/3461* (2013.01); *G01C 21/3438* (2013.01); *G05D 1/0088* (2013.01); *G05D 1/0297* (2013.01); *G06Q 10/02* (2013.01); *G08G 1/00* (2013.01); *G05D 2201/0212* (2013.01); *G05D 2201/0213* (2013.01)

(58) Field of Classification Search
CPC ...... G01C 21/3461; G06Q 10/02; G08G 1/00; G05D 1/0297
See application file for complete search history.

(56) References Cited

U.S. PATENT DOCUMENTS

| | | | |
|---|---|---|---|
| 9,547,307 B1 | 1/2017 | Cullinane et al. | |
| 2016/0370194 A1* | 12/2016 | Colijn | G01C 21/34 |
| 2018/0316634 A1* | 11/2018 | Driscoll | H04L 67/141 |

FOREIGN PATENT DOCUMENTS

| | | |
|---|---|---|
| JP | 2008-9913 A | 1/2008 |
| JP | 2015-191264 A | 11/2015 |

\* cited by examiner

*Primary Examiner* — Anne Marie Antonucci
*Assistant Examiner* — Abdalla A Khaled
(74) *Attorney, Agent, or Firm* — Sughrue Mion, PLLC

(57) ABSTRACT

A driverless transportation system includes a management server, and first and second autonomous driving vehicles. The first autonomous driving vehicle accesses a first destination and generates use difficulty information on a use difficulty of a first destination. The second autonomous driving vehicle accesses a second destination identical to the first destination or near the first destination. One of a management server and the second autonomous driving vehicle acquires the use difficulty information generated by the management server or the first autonomous driving vehicle. When the use difficulty is equal to or higher than a threshold, the one of the management server and the second autonomous driving vehicle proposes changing a destination of the second autonomous driving vehicle to a user.

4 Claims, 15 Drawing Sheets

DRIVERLESS TRANSPORTATION SYSTEM

INCORPORATION BY REFERENCE

The disclosure of Japanese Patent Application No. 2017-178762 filed on Sep. 19, 2017 including the specification, drawings and abstract is incorporated herein by reference in its entirety.

BACKGROUND

1. Technical Field

The present disclosure relates to a driverless transportation system that provides a driverless transportation service using an autonomous driving vehicle.

2. Description of Related Art

U.S. Pat. No. 9,547,307 and Japanese Unexamined Patent Application Publication No. 2015-191264 (JP 2015-191264 A) disclose a driverless transportation service using an unmanned autonomous driving vehicle. In the driverless transportation service described above, the autonomous driving vehicle needs to automatically move to a pickup position desired by a user and to be stopped.

According to the technique disclosed in U.S. Pat. No. 9,547,307, in a case where the autonomous driving vehicle approaches the pickup position desired by the user, the autonomous driving vehicle searches for a parking or stopping place. In a case where a parking or stopping place is not found, the autonomous driving vehicle is stopped at an alternative position different from the pickup position desired by the user. Then, the autonomous driving vehicle notifies the user of the alternative position and prompts the user to come to the alternative position.

According to the technique disclosed in JP 2015-191264 A, in a case where the autonomous driving vehicle arrives at the pickup position desired by the user, the autonomous driving vehicle performs processing for specifying the user. In a case where the user cannot be specified at the pickup position desired by the user, the autonomous driving vehicle moves to an alternative position different from the pickup position desired by the user and is stopped. Then, the autonomous driving vehicle notifies the user that "the autonomous driving vehicle is on standby at the alternative position" by mail or the like.

SUMMARY

According to the techniques disclosed in U.S. Pat. No. 9,547,307 and JP 2015-191264 A, the autonomous driving vehicle determines whether or the user can be picked up after the autonomous driving vehicle arrives the pickup position desired by the user or near the pickup position. In a case where determination is made that the user cannot be pickup up, the autonomous driving vehicle moves to a new position and retries to pick the user up. As described above, a lot of time may be spent until the autonomous driving vehicle arrives near the pickup position desired by the user and then picks the user up. This causes degradation in efficiency of the driverless transportation service.

The disclosure provides a driverless transportation system that, in a driverless transportation service using an autonomous driving vehicle, allows the autonomous driving vehicle to efficiently arrive at a destination.

An aspect of the disclosure relates to a driverless transportation system that provides a driverless transportation service. The driverless transportation system includes a management server, and a plurality of autonomous driving vehicles configured to perform communication with the management server. The autonomous driving vehicles include a first autonomous driving vehicle and a second autonomous driving vehicle. The first autonomous driving vehicle is an autonomous driving vehicle that accesses a first destination to pick a first user up or to allow the first user to get off. The first autonomous driving vehicle is configured to generate use difficulty information on a use difficulty of the first destination in association with the first destination based on a result of access to the first destination. The first autonomous driving vehicle is configured to send the use difficulty information to the management server. The second autonomous driving vehicle is an autonomous driving vehicle that accesses a second destination identical to the first destination or near the first destination to pick a second user up or to allow the second user to get off. The management server is configured to store the use difficulty information. One of the management server and the second autonomous driving vehicle is configured to acquire the use difficulty information from one of the management server and the first autonomous driving vehicle, when the second autonomous driving vehicle accesses the second destination after the first autonomous driving vehicle has accessed the first destination. The one of the management server and the second autonomous driving vehicle is configured to propose changing a destination of the second autonomous driving vehicle to the second user when the use difficulty is equal to or higher than a threshold.

According to the aspect of the disclosure, the first autonomous driving vehicle generates the use difficulty information indicating the use difficulty of the first destination based on the result of access to the first destination. Thereafter, when the second autonomous driving vehicle accesses the second destination regarded as being identical to the first destination, the one of the management server and the second autonomous driving vehicle acquires the use difficulty information. In a case where the use difficulty is equal to or higher than the threshold, the one of the management server and the second autonomous driving vehicle proposes changing the destination of the second autonomous driving vehicle to the second user.

Accordingly, in a case where the use difficulty of the second destination desired by the second user is higher than the threshold, before the second autonomous driving vehicle arrives near the second destination, it is possible to prompt the second user to change the destination. In a case where the destination can be changed in advance to a "new destination" of which use difficulty is lower than the threshold, the second autonomous driving vehicle does not need to approach an "original destination" of which use difficulty is higher than the threshold. That is, it is possible to allow the second autonomous driving vehicle to efficiently arrive at a destination suitable for picking the second user up or for allowing the second user to get off. This means improvement of efficiency of the driverless transportation service and is suitable.

In the driverless transportation system according to the aspect of the disclosure, the second autonomous driving vehicle may be configured to travel toward a third destination when the destination of the second autonomous driving vehicle is changed from the second destination to the third destination.

In the driverless transportation system according to the aspect of the disclosure, the second autonomous driving vehicle may be configured to start traveling toward the second destination before the destination of the second autonomous driving vehicle is changed.

In the driverless transportation system according to the aspect of the disclosure the one of the second autonomous driving vehicle or the management server may be configured to delay a timing of starting charging to the second user in a case where the destination of the second autonomous driving vehicle is changed when the second autonomous driving vehicle picks the second user up.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure will be described referring to the accompanying drawings.

1. Outline of Driverless Transportation System

Figure 1:
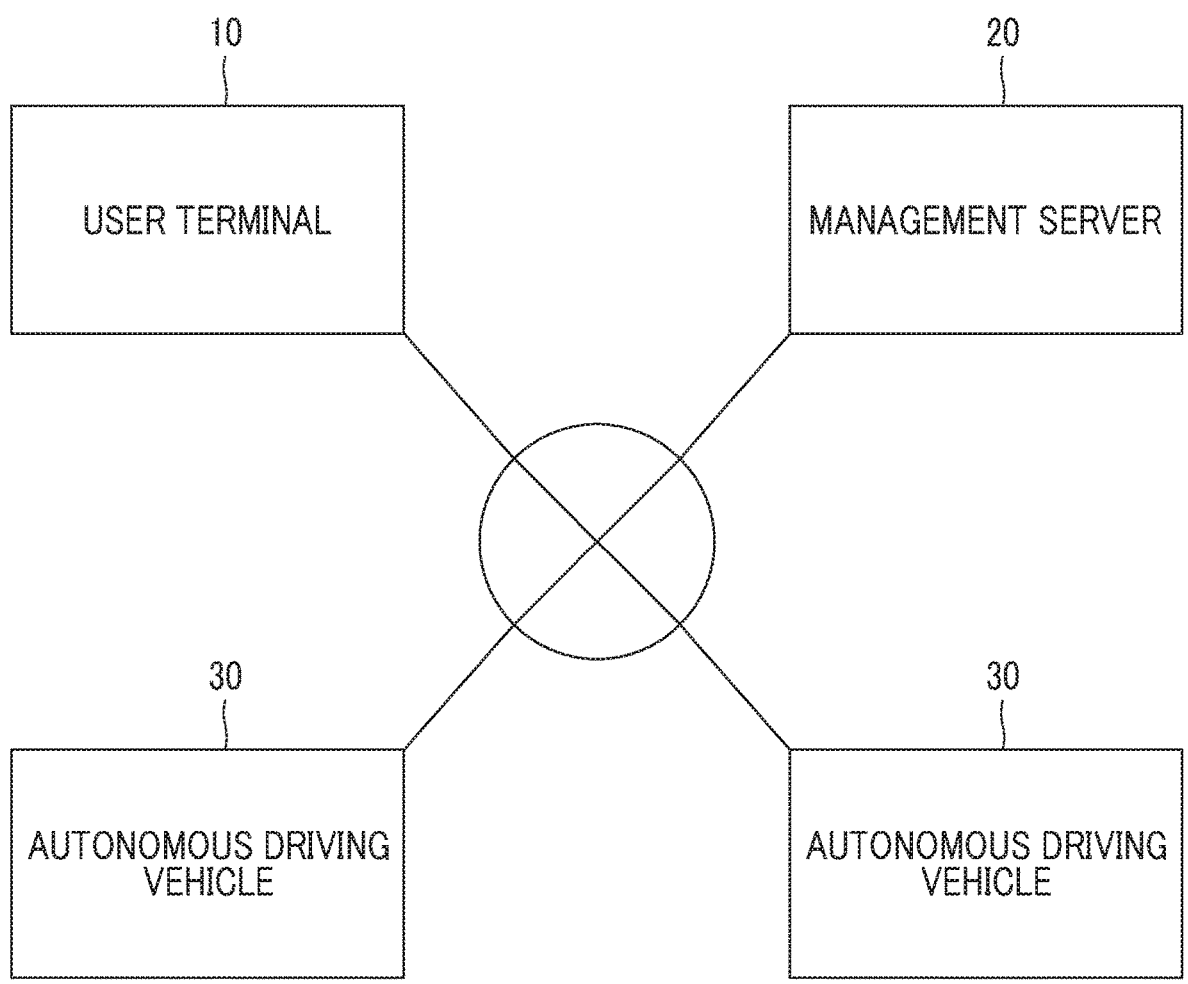
FIG. 1 is a block diagram schematically showing the configuration of a driverless transportation system according to an embodiment of the disclosure.

FIG. 1 is a block diagram schematically showing the configuration of a driverless transportation system 1 according to the embodiment of the disclosure. The driverless transportation system 1 provides a driverless transportation service to a user. The driverless transportation system 1 includes a user terminal 10, a management server 20, and a plurality of autonomous driving vehicles 30.

The user terminal 10 is a terminal that is carried with the user of the driverless transportation service. The user terminal 10 includes at least a processor, a storage device, and a communication device, and can perform various kinds of information processing and communication processing. For example, the user terminal 10 can communicate with the management server 20 and the autonomous driving vehicle 30 through a communication network. As the user terminal 10 described above, a smartphone is illustrated.

The management server 20 is a server that manages the driverless transportation service. The management server 20 includes at least a processor, a storage device, and a communication device, and can perform various kinds of information processing and communication processing. For example, the management server 20 can communicate with the user terminal 10 and the autonomous driving vehicle 30 through the communication network. The management server 20 manages information of the user. The management server 20 manages vehicle allocation or the like of the autonomous driving vehicle 30.

The autonomous driving vehicle 30 can be in an unmanned operation. The user gets in the autonomous driving vehicle 30, and the autonomous driving vehicle 30 provides the driverless transportation service to the user. The autonomous driving vehicle 30 can communicate with the user terminal 10 and the management server 20 through the communication network.

A basic flow of the driverless transportation service is as follows.

First, the user transmits a vehicle allocation request using the user terminal 10. The vehicle allocation request includes a pickup position desired by the user, or the like. The vehicle allocation request is sent to the management server 20 through the communication network. The management server 20 selects the autonomous driving vehicle 30 that provides the service to the user and sends information of the vehicle allocation request to the selected autonomous driving vehicle 30. The autonomous driving vehicle 30 that receives information of the vehicle allocation request automatically moves toward the pickup position desired by the user.

The autonomous driving vehicle 30 arrives at the pickup position desired by the user and is stopped. The user gets in the autonomous driving vehicle 30. The user sends a desired getting-off position to the autonomous driving vehicle 30. Information of the getting-off position may be included in the vehicle allocation request. The autonomous driving vehicle 30 automatically travels toward the getting-off position. The autonomous driving vehicle 30 arrives at the getting-off position and is stopped. The user gets off the autonomous driving vehicle 30.

In the following description, the pickup position desired by the user and the getting-off position are collectively referred to as a "destination". As described above, in the driverless transportation service, the autonomous driving vehicle 30 needs to automatically move the destination and to be stopped.

2. Destination Change Proposal based on Use Difficulty Information

There is a case where it is difficult to allow the autonomous driving vehicle to pick the user up or to allow the user to get off at a destination due to various reasons. As various reasons, a reason that the autonomous driving vehicle cannot access the destination due to congestion, a reason that the autonomous driving vehicle cannot be parked and stopped at a destination, a reason that a host vehicle position cannot be accurately calculated based on sensor information, and the like are considered. The degree of difficulty in using a destination to pick the user up or to allow the user to get off is hereinafter referred to as a "use difficulty". Information indicating a destination and a use difficulty of the destination in association with each other is hereinafter referred to as "use difficulty information AVA".

When the autonomous driving vehicle 30 accesses a certain destination, in a case where it is understood in advance that a use difficulty of the destination is higher than a threshold, the autonomous driving vehicle 30 can propose changing the destination to the user before arriving near the destination. In a case where the destination can be changed to a "new destination" of which use difficulty is lower than the threshold, the autonomous driving vehicle 30 does not need to approach an "original destination" of which use difficulty is higher than the threshold. That is, the autonomous driving vehicle 30 can efficiently arrive at a destination suitable for picking the user up or allowing the user to get off.

From the above viewpoint, according to the embodiment of the disclosure, use difficulty information AVA relating to various positions is collected. The use difficulty information AVA is also collected by the autonomous driving vehicle 30. That is, when a certain autonomous driving vehicle 30 accesses a destination, the certain autonomous driving vehicle 30 collects the use difficulty information AVA relating to the destination. Thereafter, when another autonomous driving vehicle 30 accesses the same destination, the use difficulty information AVA relating to the destination is referred to, and changing the destination is performed as needed.

Hereinafter, for description, two autonomous driving vehicles 30 that access the same destination are considered. In more detail, a first autonomous driving vehicle 30-1 accesses a first destination DE1 to pick a first user up or to allow the first user to get off. A second autonomous driving vehicle 30-2 accesses a second destination DE2 to pick a second user up or to allow the second user to get off. The second destination DE2 is identical to the first destination DE1 or near the first destination DE1. That is, the second destination DE2 is a position that can be regarded as being identical to the first destination DE1. In other words, the first destination DE1 and the second destination DE2 are included in a region R of a size enough to be regarded as the same environment.

Figure 2:
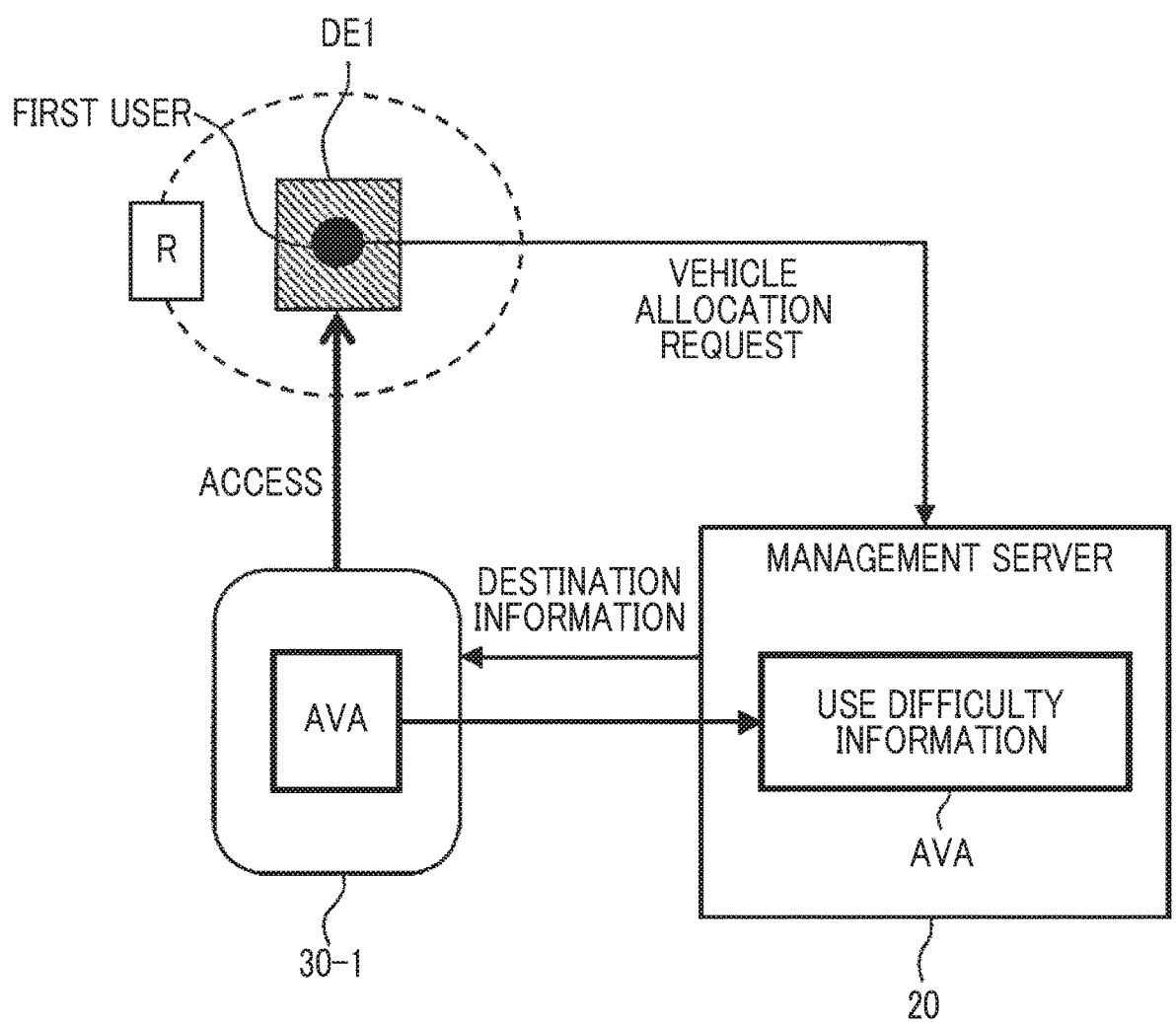
FIG. 2 is a conceptual diagram illustrating collection of use difficulty information in the embodiment.

FIG. 2 is a conceptual diagram illustrating collection of the use difficulty information AVA. As an example, a case where the first autonomous driving vehicle 30-1 picks the first user up is considered. The first user transmits a vehicle allocation request to the management server 20 using the user terminal 10 of the first user. A pickup position desired by the first user is included in the vehicle allocation request. The management server 20 notifies the first autonomous driving vehicle 30-1 the pickup position desired by the first user as the first destination DEL The first autonomous driving vehicle 30-1 accesses the first destination DE1 and tries to pick the first user up. Then, the first autonomous driving vehicle 30-1 generates use difficulty information AVA indicating a use difficulty of the first destination DE1 and the first destination DE1 in association with each other based on a result of access to the first destination DEL The first autonomous driving vehicle 30-1 sends the generated use difficulty information AVA to the management server 20, and the management server 20 stores the received use difficulty information AVA in the storage device.

Figure 3:
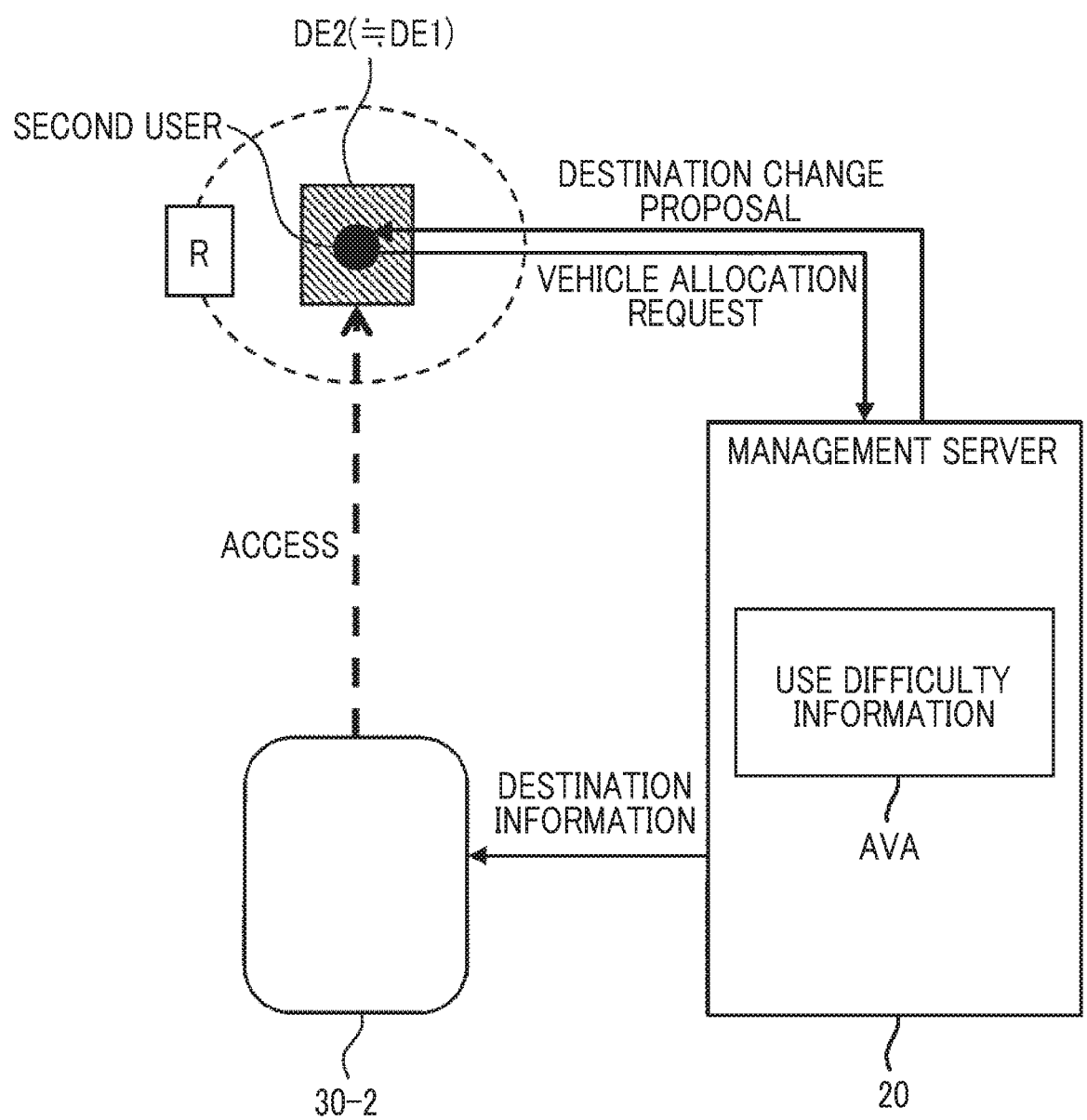
FIG. 3 is a conceptual diagram illustrating utilization of the use difficulty information in the embodiment.

FIG. 3 is a conceptual diagram illustrating utilization of the use difficulty information AVA. As an example, a case where the second autonomous driving vehicle 30-2 picks the second user up after the first autonomous driving vehicle 30-1 has accessed the first destination DE1 is considered. The second user transmits a vehicle allocation request to the management server 20 using the user terminal 10 of the second user. A pickup position desired by the second user is included in the vehicle allocation request. The pickup position desired by the second user is the second destination DE2. The management server 20 acquires, from the storage device, the use difficulty information AVA relating to the first destination DE1 that can be regarded as being identical to the second destination DE2.

The management server 20 determines whether or not the use difficulty is equal to or higher than a threshold based on the acquired use difficulty information AVA. In a case where the use difficulty is equal to or higher than the threshold, the management server 20 proposes changing the destination of the second autonomous driving vehicle 30-2 to the second user. Here, the proposal of changing the destination may be positively proposing a new destination (hereinafter, referred to as a "third destination DE3") or proposing (requesting) designating the third destination DE3 to the user. Notification of the destination change proposal is sent from the management server 20 to the user terminal 10 of the second user.

The second user approves the proposed third destination DE3 or designates the third destination DE3 using the user terminal 10 of the second user. In a case where the destination is changed from the second destination DE2 to the third destination DE3, the management server 20 notifies the second autonomous driving vehicle 30-2 of the third destination DE3. The second autonomous driving vehicle 30-2 accesses the third destination DE3 after change, instead of accessing the second destination DE2 before change, and picks the second user up.

Figure 4:
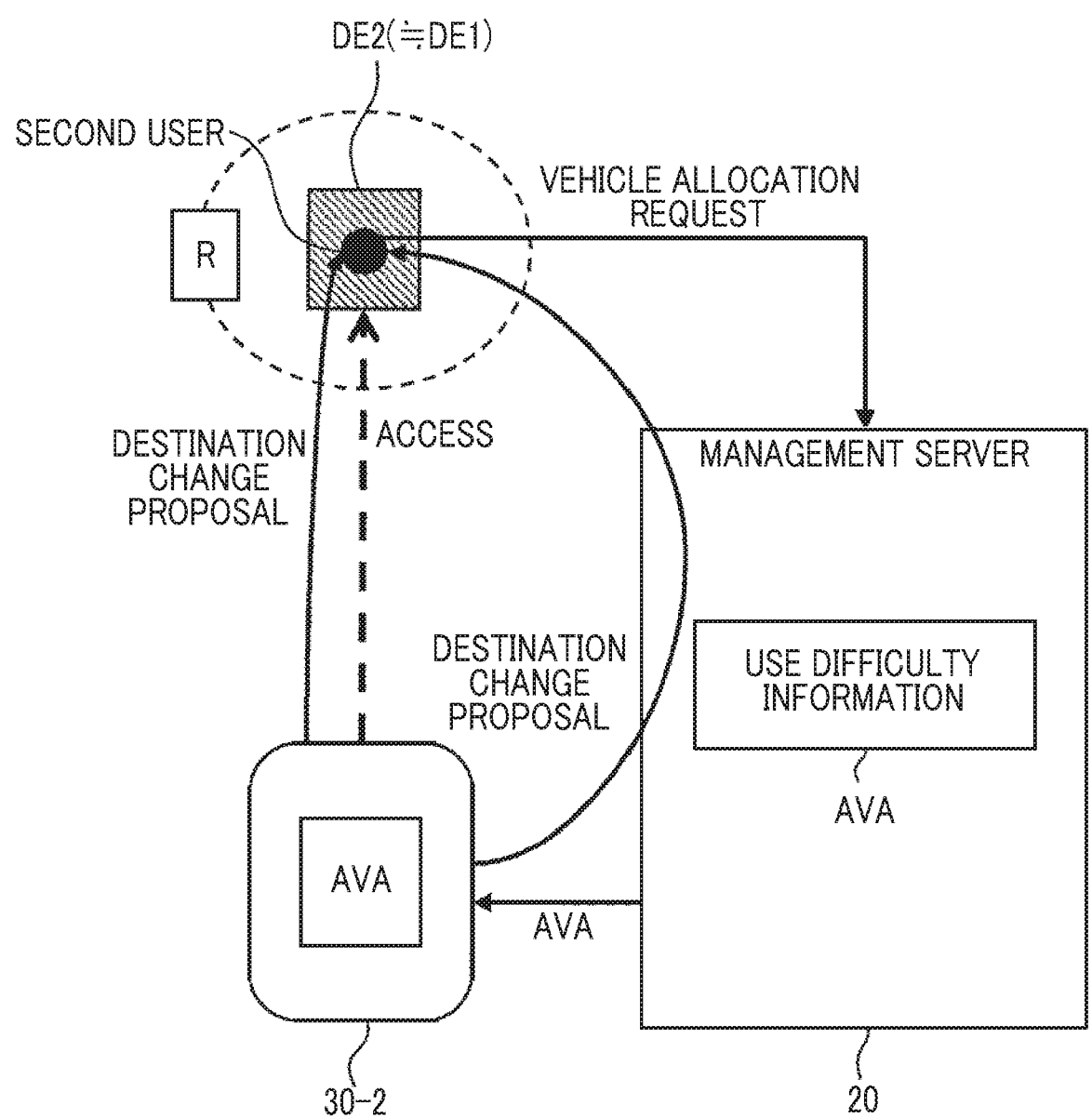
FIG. 4 is a conceptual diagram illustrating utilization of the use difficulty information in the embodiment.

FIG. 4 is a conceptual diagram illustrating another example of utilization of the use difficulty information AVA. In the example shown in FIG. 4, determination of the use difficulty information AVA is performed by the second autonomous driving vehicle 30-2. Specifically, the management server 20 sends information of the second destination DE2 and the use difficulty information AVA corresponding to information of the second destination DE2 to the second autonomous driving vehicle 30-2 in response to reception of the vehicle allocation request. The second autonomous driving vehicle 30-2 determines whether or not the use difficulty is equal to or higher than the threshold based on the acquired use difficulty information AVA. In a case where the use difficulty is equal to or higher than the threshold, the second autonomous driving vehicle 30-2 proposes changing the destination to the second user. At this time, the second autonomous driving vehicle 30-2 may send or provide notification of the destination change proposal to the user terminal 10 of the second user directly or through the management server 20.

Figure 5:
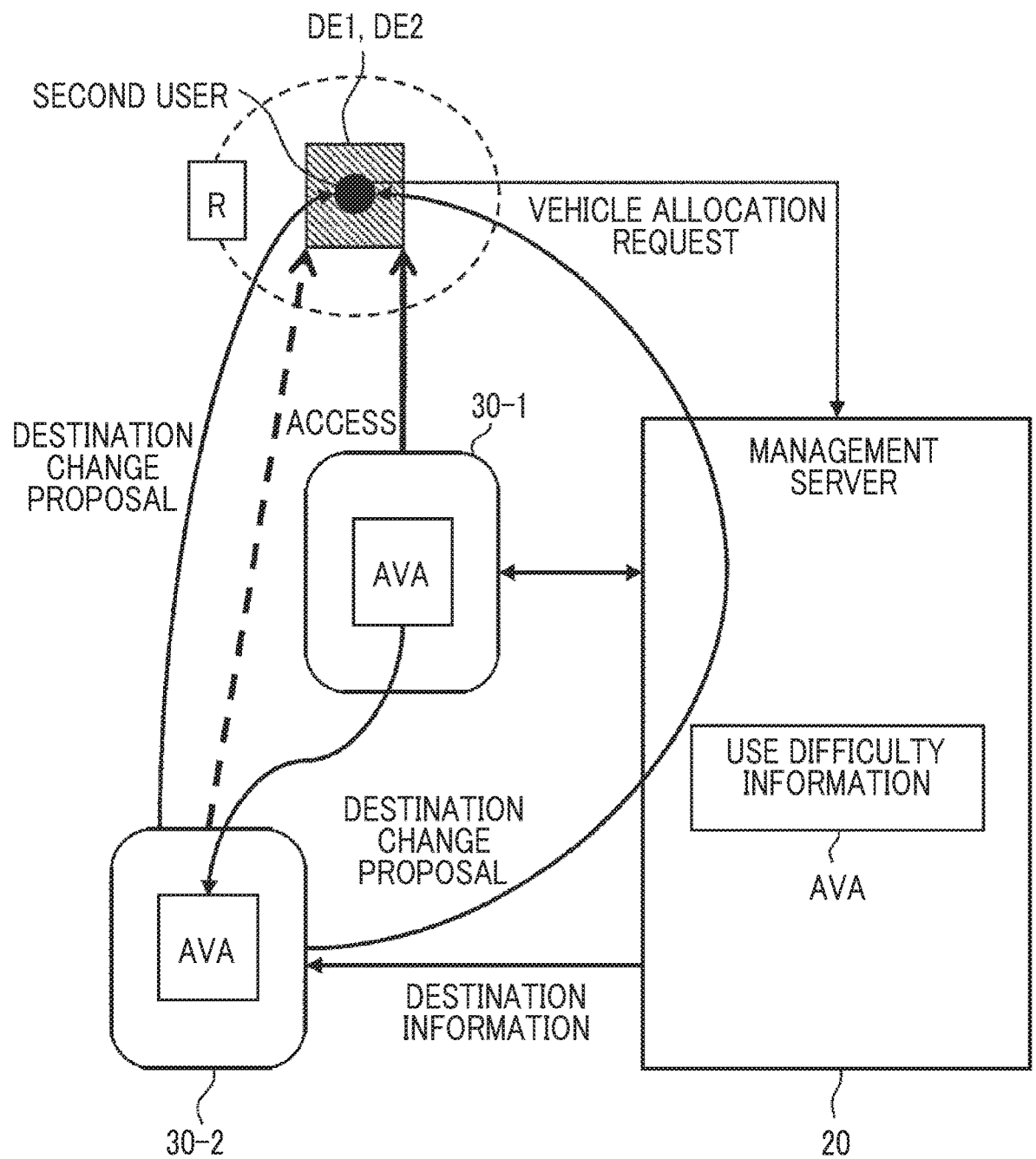
FIG. 5 is a conceptual diagram illustrating utilization of the use difficulty information in the embodiment.

FIG. 5 is a conceptual diagram illustrating still another example of utilization of the use difficulty information AVA.

In the example shown in FIG. 5, the first autonomous driving vehicle 30-1 is yet near the first destination DE1 (that is, the second destination DE2). In this case, the second autonomous driving vehicle 30-2 may directly acquire the use difficulty information AVA from the first autonomous driving vehicle 30-1 through vehicle-to-vehicle communication. With this, the second autonomous driving vehicle 30-2 can recognize a present use difficulty substantially in real time. In a case where the use difficulty is equal to or higher than the threshold, the second autonomous driving vehicle 30-2 proposes changing the destination to the second user. At this time, the second autonomous driving vehicle 30-2 may send or provide notification of the destination change proposal to the user terminal 10 of the second user directly or through the management server 20.

Figure 6:
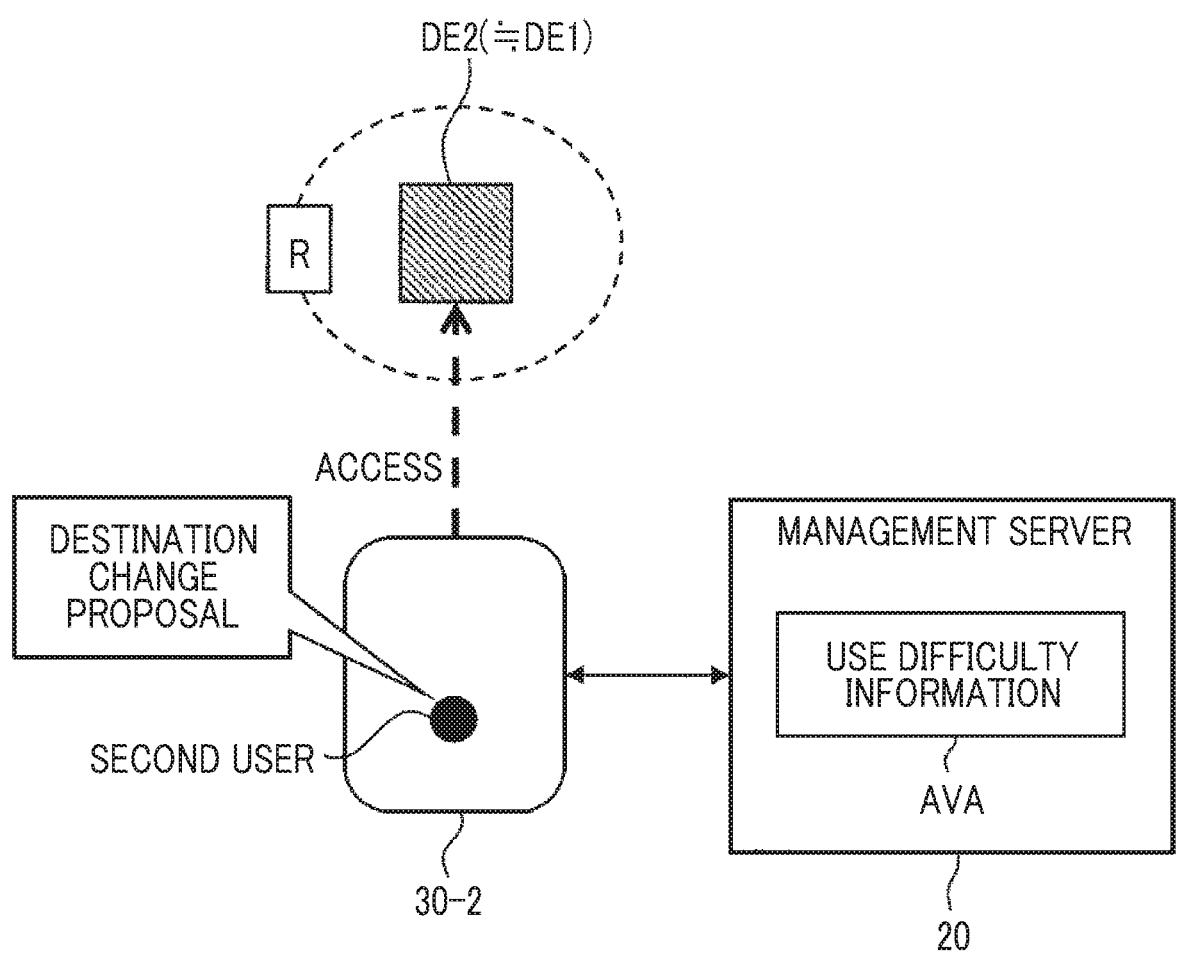
FIG. 6 is a conceptual diagram illustrating utilization of the use difficulty information in the embodiment.

FIG. 6 is a conceptual diagram illustrating still another example of utilization of the use difficulty information AVA. In FIG. 6, a case where the second user gets off is considered. In a case where the second user gets in the second autonomous driving vehicle 30-2, the second user sends a desired getting-off position to the second autonomous driving vehicle 30-2. The getting-off position desired by the second user is the second destination DE2.

The second autonomous driving vehicle 30-2 acquires the use difficulty information AVA corresponding to the second destination DE2 from the management server 20. Then, the second autonomous driving vehicle 30-2 determines whether or not the use difficulty is equal to or higher than the threshold based on the acquired use difficulty information AVA. In a case where the use difficulty is equal to or higher than the threshold, the second autonomous driving vehicle 30-2 proposes changing the destination to the second user. For example, the second autonomous driving vehicle 30-2 directly notifies the user of the destination change proposal using an in-vehicle device, such as a display or a speaker. The second autonomous driving vehicle 30-2 may send notification of the destination change proposal to the user terminal 10 of the second user through communication.

Determination of the use difficulty information AVA may be performed by the management server 20. Specifically, the second autonomous driving vehicle 30-2 notifies the management server 20 of the getting-off position as the second destination DE2. The management server 20 reads the use difficulty information AVA corresponding to the second destination DE2 from the storage device. Then, the management server 20 determines whether or not the use difficulty is equal to or higher than the threshold based on the acquired use difficulty information AVA. In a case where the use difficulty is equal to or higher than the threshold, the management server 20 proposes changing the destination to the second user. At this time, the management server 20 may send or provide notification of the destination change proposal to the user terminal 10 of the second user directly or through the second autonomous driving vehicle 30-2.

As described above, according to the embodiment of the disclosure, the first autonomous driving vehicle 30-1 generates the use difficulty information AVA indicating the use difficulty of the first destination DE1 and the first destination DE1 in association with each other based on a result of access to the first destination DEL The management server 20 stores the use difficulty information AVA. After the first autonomous driving vehicle 30-1 has accessed the first destination DE1, when the second autonomous driving vehicle 30-2 accesses the second destination DE2, the management server 20 or the second autonomous driving vehicle 30-2 acquires the use difficulty information AVA from the management server 20 or the first autonomous driving vehicle 30-1. In a case where the use difficulty is equal to or higher than the threshold, the management server 20 or the second autonomous driving vehicle 30-2 proposes changing the destination of the second autonomous driving vehicle 30-2 to the second user.

As described above, in a case where the use difficulty of the second destination DE2 desired by the second user is higher than the threshold, before the second autonomous driving vehicle 30-2 arrives near the second destination DE2, it is possible to prompt the second user to change the destination. In a case where the destination can be changed in advance to a "new destination (third destination DE3)" of which use difficulty is lower than the threshold, the second autonomous driving vehicle 30-2 does not need to approach an "original second destination DE2" of which use difficulty is higher than the threshold. That is, the second autonomous driving vehicle 30-2 can efficiently arrive at a destination suitable for picking the second user up or allowing the second user to get off. This means improvement of efficiency of the driverless transportation service and is suitable.

Hereinafter, the autonomous driving vehicle 30 and the driverless transportation system 1 according to the embodiment of the disclosure will be described in more detail.

3. Configuration Example of Autonomous Driving Vehicle

Figure 7:
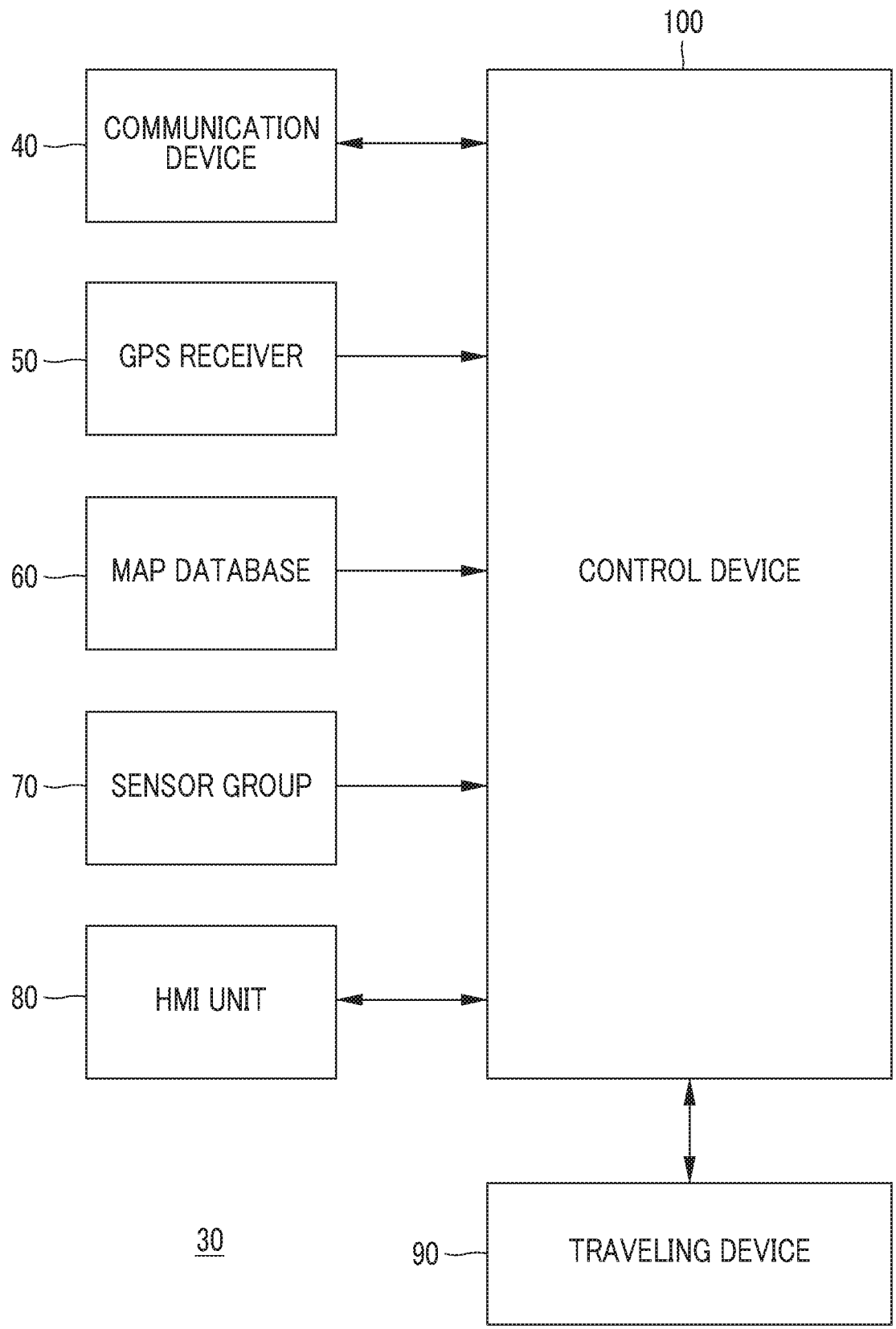
FIG. 7 is a block diagram schematically showing a configuration example of an autonomous driving vehicle according to the embodiment.

FIG. 7 is a block diagram showing a configuration example of the autonomous driving vehicle 30 according to the embodiment of the disclosure. The autonomous driving vehicle 30 includes a communication device 40, a global positioning system (GPS) receiver 50, a map database 60, a sensor group 70, a human machine interface (HMI) unit 80, a traveling device 90, and a control device 100.

The communication device 40 performs communication with the outside of the autonomous driving vehicle 30. Specifically, the communication device 40 performs communication with the user terminal 10 through a communication network. The communication device 40 performs communication with the management server 20 through the communication network. The communication device 40 has a function of performing vehicle-to-everything (V2X) communication (vehicle-to-vehicle communication and road-to-vehicle communication) with a peripheral vehicle or a roadside infrastructure. For example, the communication device 40 can perform vehicle-to-vehicle (V2V) communication with another autonomous driving vehicle 30.

The GPS receiver 50 receives signals transmitted from a plurality of GPS satellites and calculates a position and an azimuth (posture) of the autonomous driving vehicle 30 based on the received signals. The GPS receiver 50 sends position and azimuth information to the control device 100.

In the map database 60, map information is recorded. The map database 60 is stored in a predetermined storage device. The control device 100 can acquire map information around the autonomous driving vehicle 30 from the map database 60 based on the position and azimuth information.

The sensor group 70 detects circumstances (environment) around the autonomous driving vehicle 30. As the sensor group 70, laser imaging detection and ranging (LIDAR), a radar, a camera, and the like are illustrated. The lidar detects an object around the autonomous driving vehicle 30 using light. The radar detects an object around the autonomous driving vehicle 30 using an electric wave. The camera captures circumstances around the autonomous driving vehicle 30. The sensor group 70 sends detection information as surrounding circumstance information to the control device 100.

The HMI unit 80 is an interface that notifies the user of information and receives information from the user. For example, the HMI unit 80 includes a display device, a speaker, an input device, and a microphone. The HMI unit 80 can notify the user of various kinds of information through the display device or the speaker. As the input device, a touch panel, a switch, or a button is illustrated. The user can input various kinds of information to the HMI unit 80 using the input device or the microphone.

The traveling device 90 includes a steering device, a drive device, and a braking device. The steering device steers wheels. The drive device is a power source that generates drive power. As the drive device, an electric motor or an engine is illustrated. The braking device generates braking force.

The control device 100 controls the autonomous driving vehicle 30. In particular, the control device 100 controls the driverless transportation service with the autonomous driving vehicle 30. For example, the control device 100 calculates the use difficulty or generates the use difficulty information AVA. The control device 100 performs communication with the user terminal 10 or the management server 20 using the communication device 40. The control device 100 performs control such that the traveling device 90 controls traveling of the autonomous driving vehicle 30. Typically, the control device 100 is a microcomputer including a processor, a memory, and an input/output interface. The control device 100 is also referred to as an electronic control unit (ECU).

4. Various Examples of Use Difficulty

The control device 100 of the first autonomous driving vehicle 30-1 generates the use difficulty information AVA indicating the use difficulty of the first destination DE1 and the first destination DE1 in association with each other based on the result of access to the first destination DE1 (see FIG. 2). As the use difficulty, various examples are considered as follows.

4-1. First Example

In a first example, a use difficulty is calculated based on a "time" needed for accessing the first destination DEL A measurement start timing of the needed time is, for example, a timing at which the first autonomous driving vehicle 30-1 enters a region within a given distance from the first destination DEL The control device 100 can detect the measurement start timing based on the position and azimuth information and the map information. As a measurement end timing of the needed time, a timing at which the first autonomous driving vehicle 30-1 is stopped at the first destination DE1 or a timing at which the pickup or getting-off of the first user at the first destination DE1 is completed is used.

When the needed time is long, this means that there is any factor of obstructing access to the first destination DEL Accordingly, the control device 100 calculates the use difficulty to be higher when the needed time becomes longer. With the use of the needed time, it is possible to define the use difficulty qualitatively and with high accuracy.

In a case where a measured time exceeds a predetermined upper limit value before the first autonomous driving vehicle 30-1 arrives at the first destination DE1, the control device 100 may set the use difficulty to a maximum value at this time.

4-2. Second Example

In a second example, a use difficulty is calculated based on a "redoing frequency" of processing for picking the first user up or allowing the first user to get off. For example, when the first user is picked up, the control device 100 stops the first autonomous driving vehicle 30-1 at the first destination DE1 or recognizes the first user based on the surrounding circumstance information detected by the sensor group 70. In a case where the above-described processing fails and the first user cannot be picked up, the control device 100 replans the pickup of the first user. That is, redoing of the processing for picking the first user up occurs.

When redoing occurs, this means that there is any factor of obstructing stopping at the first destination DE1 or the pickup of the first user. Accordingly, the control device 100 calculates the use difficulty to be higher when the redoing frequency is greater. With the use of the redoing frequency, it is possible to define the use difficulty qualitatively and with high accuracy.

4-3. Third Example

The control device 100 of the autonomous driving vehicle 30 can recognize a vehicle position with high accuracy by combining the surrounding circumstance information detected by the sensor group 70 with the map information (the processing described above is referred to as "localization"). Specifically, in the map information, information of landmark objects, such as monuments, signboards, road-side structures, and white lines, are registered in advance. The control device 100 recognizes the same landmark object based on the surrounding circumstance information detected by the sensor group 70. The control device 100 can recognize the vehicle position with high accuracy by comparing the landmark object recognized using the sensor group 70 with the landmark objects registered in the map information.

In general, the accuracy of vehicle position information obtained by localization is higher than that of vehicle position information obtained by the GPS receiver 50. Accordingly, the autonomous driving vehicle 30 suitably performs localization, and accesses to a destination and is stopped using the vehicle position information obtained by localization.

However, there may be a case where localization is hardly performed depending on an environment around the autonomous driving vehicle 30. For example, in a case where a landmark object is invisible from the sensor group 70 due to stopped vehicles, constructions, a plurality of passers-by, or the like, localization is hardly performed. Instead, in a case where a white line or paint is blurred or appears, localization is hardly performed.

In the third example, a use difficulty is calculated based on a "difficulty of localization". The difficulty of localization can be obtained based on whether or not localization processing is actually successful, the degree of congestion of vehicles or passers-by near the destination, the degree of blurring of the white line, or the like. The use difficulty is calculated to be higher when the difficulty of localization is higher.

4-4. Fourth Example

A use difficulty may be given in the format of a flag. Specifically, determination about whether or not the use difficulty is equal to or higher than the threshold is performed in advance. In a case where the use difficulty is lower than the threshold, a use difficulty flag is set to "0", and in a case where the use difficulty is equal to or higher than the threshold, the use difficulty flag is set to "1". In a case where the use difficulty flag is changed from "0" to "1", the above-described flag state is maintained at least for a given period. After the given period has elapsed, the use difficulty flag may be reset to "0". The setting and update of the use difficulty flag may be performed by one of the management server 20 and the first autonomous driving vehicle 30-1 (control device 100).

When the second autonomous driving vehicle 30-2 accesses the second destination DE2, the management server 20 or the second autonomous driving vehicle 30-2 acquires the use difficulty information AVA and determines whether the use difficulty flag is "1" or "0". Determination about whether the use difficulty flag is "1" or "0" is equivalent to determination about whether or not the use difficulty is equal to or higher than the threshold.

5. Various Processing Examples relating to Destination Change Proposal

Hereinafter, various processing examples of the destination change proposal in the driverless transportation system 1 according to the embodiment of the disclosure will be described. It is assumed that the use difficulty information AVA corresponding to the second destination DE2 is already stored in the storage device of the management server 20.

5-1. First Processing Example

Figure 8:
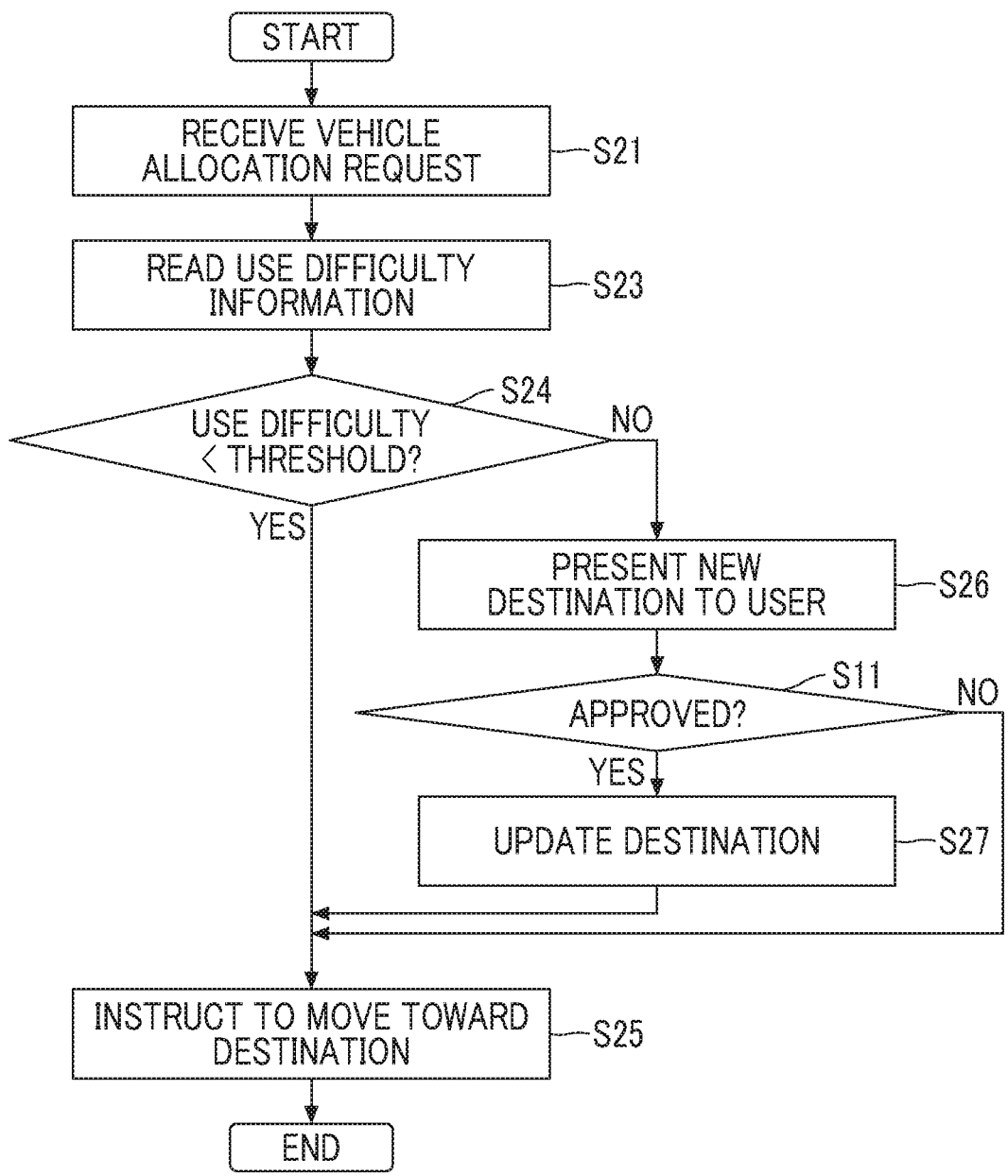
FIG. 8 is a flowchart showing a first processing example in a driverless transportation system according to the embodiment.

FIG. 8 is a flowchart showing a first processing example. In the first processing example, a case where the second autonomous driving vehicle 30-2 picks the second user up is considered (see FIG. 3). The second user transmits the vehicle allocation request to the management server 20 using the user terminal 10 of the second user. The management server 20 receives the vehicle allocation request (Step S21).

In the vehicle allocation request, the pickup position desired by the second user is included. The pickup position desired by the second user is the second destination DE2. The management server 20 reads the use difficulty information AVA corresponding to the second destination DE2 from the storage device (Step S23). Then, the management server 20 determines whether or not the use difficulty is lower than the threshold (Step S24).

In a case where the use difficulty is lower than the threshold (Step S24; Yes), the process progresses to Step S25. In Step S25, the management server 20 sends information of the second destination DE2 to the second autonomous driving vehicle 30-2 and instructs the second autonomous driving vehicle 30-2 to travel toward the second destination DE2. The control device 100 of the second autonomous driving vehicle 30-2 receives the instruction and information from the management server 20 through the communication device 40. Then, the control device 100 performs control such that the traveling device 90 allows the second autonomous driving vehicle 30-2 to travel toward the second destination DE2.

In a case where the use difficulty is equal to or higher than the threshold (Step S24; No), the management server 20 proposes changing the destination to the second user. Specifically, the management server 20 performs communication with the user terminal 10 of the second user and presents the third destination DE3 as a new destination to the second user (Step S26). For example, the management server 20 selects, as the third destination DE3, a position of which use difficulty is lower than the threshold from among positions of which use difficulty is known. The second user approves or disapproves the presented third destination DE3 using the user terminal 10 of the second user (Step S11). Information of approval or disapproval is sent from the user terminal 10 to the management server 20 through communication.

In a case where the second user approves the third destination DE3 (Step S11; Yes), the management server 20 updates the destination of the second autonomous driving vehicle 30-2 to the third destination DE3 and sends information of the third destination DE3 to the second autonomous driving vehicle 30-2 (Step S27). The control device 100 of the second autonomous driving vehicle 30-2 allows the second autonomous driving vehicle 30-2 to travel toward the third destination DE3 after update.

In a case where the second user disapproves the third destination DE3 (Step S11; No), the management server 20 performs Step S25 without updating the destination.

In the above-described first processing example, the use difficulty is determined by the management server 20 that receives the vehicle allocation request. In this case, it is possible to propose changing the destination in an earlier stage than in a case where the second autonomous driving vehicle 30-2 determines the use difficulty. Changing destination is performed solely in a case where the approval of the second user is obtained. With this, convenience for the user is improved.

5-2. Second Processing Example

Figure 9:
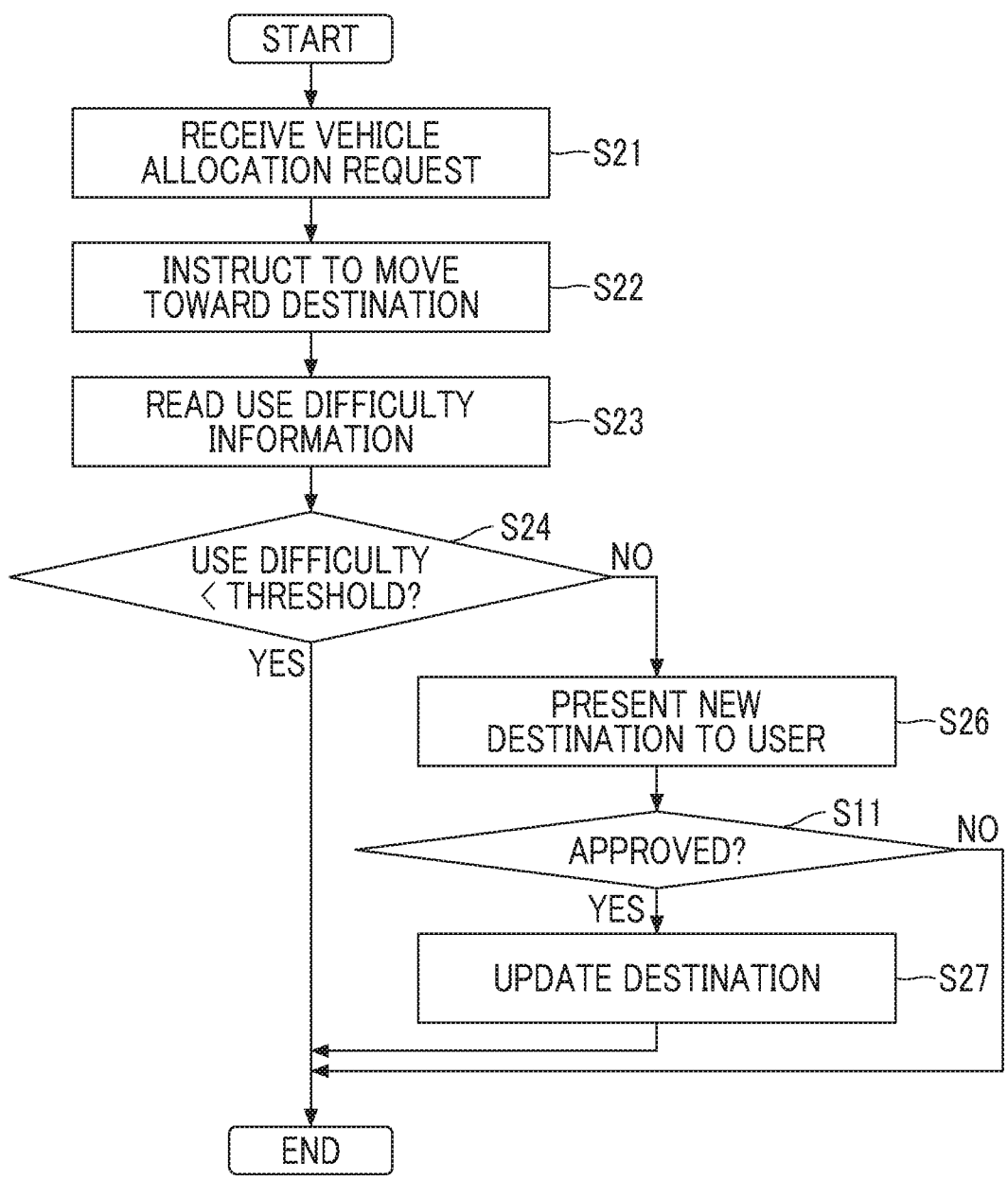
FIG. 9 is a flowchart showing a second processing example in a driverless transportation system according to the embodiment.

FIG. 9 is a flowchart showing a second processing example. The second processing example is a modification of the first processing example. Description overlapping the first processing example will be appropriately omitted.

In the second processing example, the second autonomous driving vehicle 30-2 starts to travel toward the second destination DE2 before determination of the use difficulty. Specifically, Step S22 is performed after Step S21 and before Step S24. In Step S22, the management server 20 sends information of the second destination DE2 to the second autonomous driving vehicle 30-2 and instructs the second autonomous driving vehicle 30-2 to travel toward the second destination DE2. The control device 100 of the second autonomous driving vehicle 30-2 performs control such that the traveling device 90 allows the second autonomous driving vehicle 30-2 to travel toward the second destination DE2.

Subsequent processing is the same as in the first processing example. In a case where the second user approves the third destination DE3 (Step S11; Yes), the management server 20 updates the destination and sends information of the third destination DE3 after update to the second autonomous driving vehicle 30-2 (Step S27). The control device 100 of the second autonomous driving vehicle 30-2 allows the second autonomous driving vehicle 30-2 to travel toward the third destination DE3.

In a case where the second user disapproves the third destination DE3 (Step S11; No), the management server 20 maintains the destination as it is without updating the destination. The control device 100 of the second autonomous driving vehicle 30-2 allows the second autonomous driving vehicle 30-2 to travel toward the second destination DE2 as it is.

According to the above-described second processing example, before Steps S24 to S27, the second autonomous driving vehicle 30-2 starts to move toward the second destination DE2. Even though the destination is updated, the third destination DE3 after update is not greatly different from the original second destination DE2. Accordingly, the time at which the second autonomous driving vehicle 30-2 arrives the destination is expected to be earlier than in the first processing example. In other words, with the effective use of the period of Steps S24 to S27, it is possible to allow the second autonomous driving vehicle 30-2 to more efficiently move.

5-3. Third Processing Example

Figure 10:
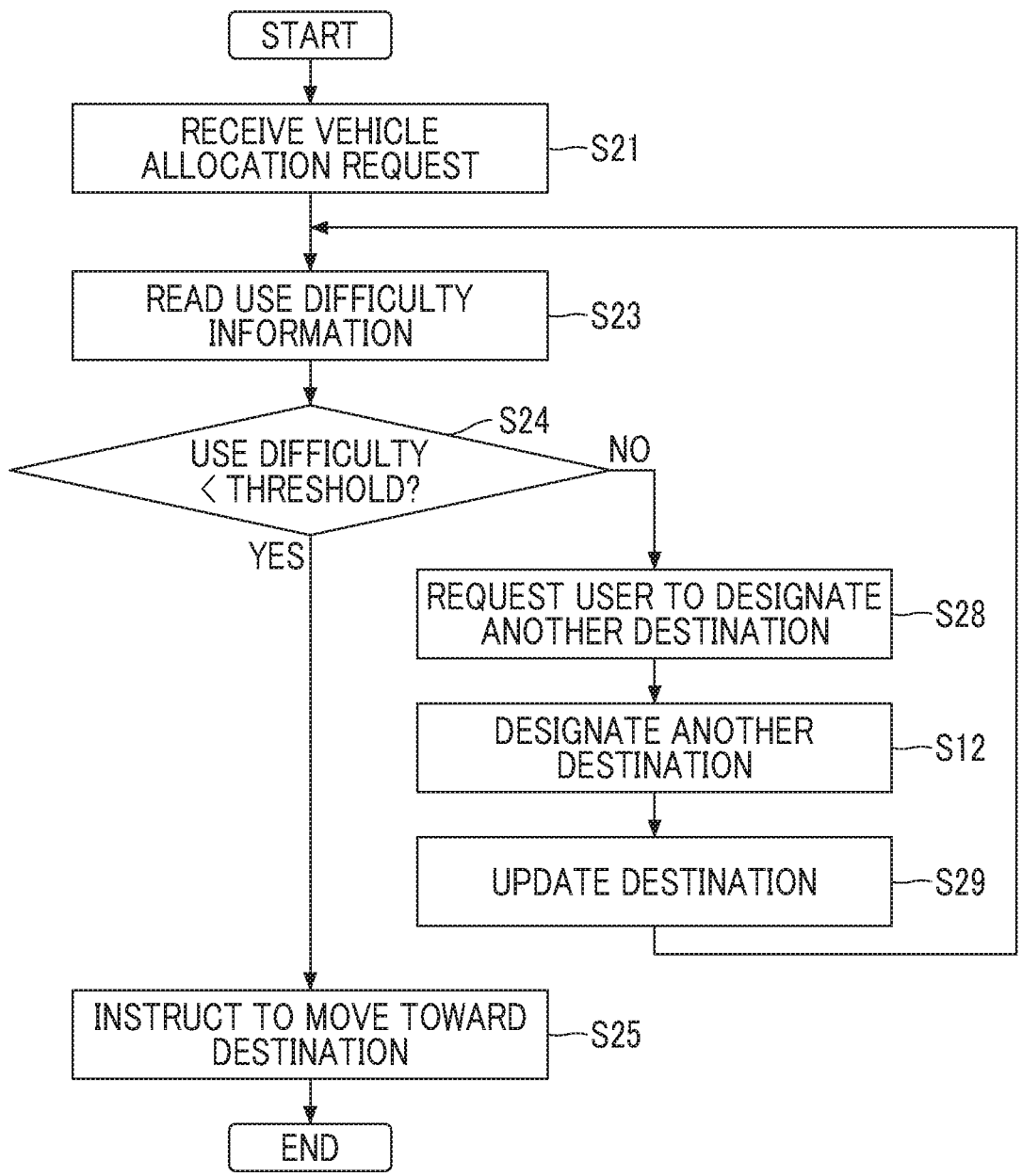
FIG. 10 is a flowchart showing a third processing example in a driverless transportation system according to the embodiment.

FIG. 10 is a flowchart showing a third processing example. The third processing example is a modification of the first processing example. Steps S21 to S25 are the same as in the first processing example. In determination of Step S24, in a case where the use difficulty is equal to or higher than the threshold (Step S24; No), the management server 20 proposes changing the second destination DE2 to the second user.

In the third processing example, the management server 20 performs communication with the user terminal 10 of the second user and requests the user to designate the third destination DE3 as another destination (Step S28). The second user designates the third destination DE3 using the user terminal 10 of the second user (Step S12). Information of the third destination DE3 designated by the second user is sent from the user terminal 10 to the management server 20 through communication. The management server 20 updates the destination of the second autonomous driving vehicle 30-2 to the third destination DE3 designated by the second user (Step S29). Thereafter, the process returns to Step S23. In Step S23, the use difficulty information AVA (if any) corresponding to the third destination DE3 is read.

According to the above-described third processing example, the preference of the second user is easily reflected in the destination.

5-4. Fourth Processing Example

Figure 11:
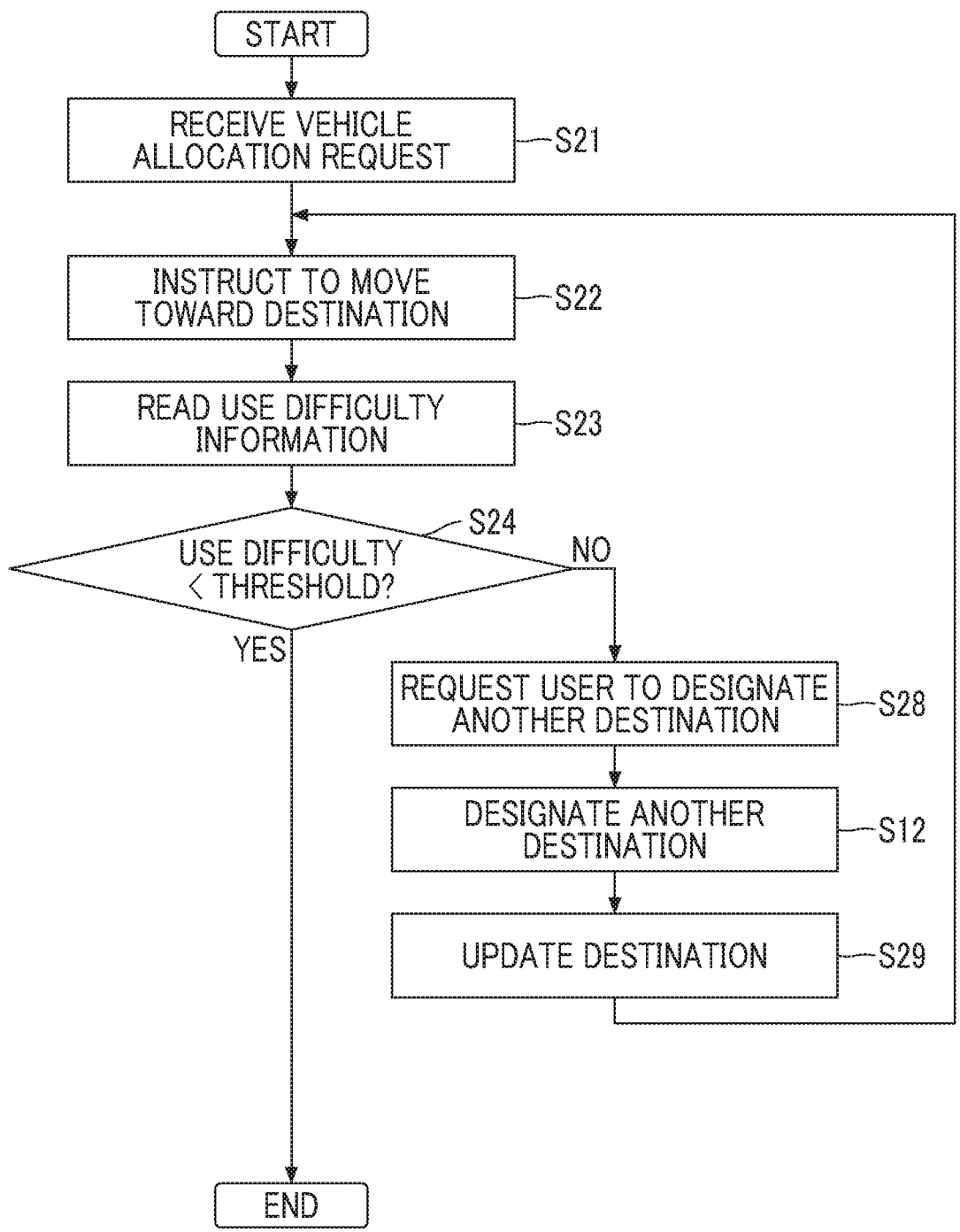
FIG. 11 is a flowchart showing a fourth processing example in a driverless transportation system according to the embodiment.

FIG. 11 is a flowchart showing a fourth processing example. The fourth processing example is a combination of the second processing example and the third processing example. Description overlapping the above-described processing examples will be appropriately omitted.

Specifically, Step S22 is performed after Step S21 and before Step S24. In Step S22, the management server 20 sends information of the second destination DE2 to the second autonomous driving vehicle 30-2 and instructs the second autonomous driving vehicle 30-2 to travel toward the second destination DE2. The control device 100 of the second autonomous driving vehicle 30-2 performs control such that the traveling device 90 allows the second autonomous driving vehicle 30-2 to travel toward the second destination DE2.

Subsequent processing is the same as in the third processing example. In a case where the destination is updated (Step S29), the management server 20 sends information of the third destination DE3 after update to the second autonomous driving vehicle 30-2 (Step S22). The control device 100 of the second autonomous driving vehicle 30-2 allows the second autonomous driving vehicle 30-2 to travel toward the third destination DE3.

According to the above-described fourth processing example, with the effective use of the period of Steps S24 to S29, it is possible to allow the second autonomous driving vehicle 30-2 to more efficiently move.

5-5. Fifth Processing Example

In a fifth processing example, a case where the second autonomous driving vehicle 30-2 determines the use difficulty, instead of the management server 20, is considered (see FIG. 4).

Figure 12:
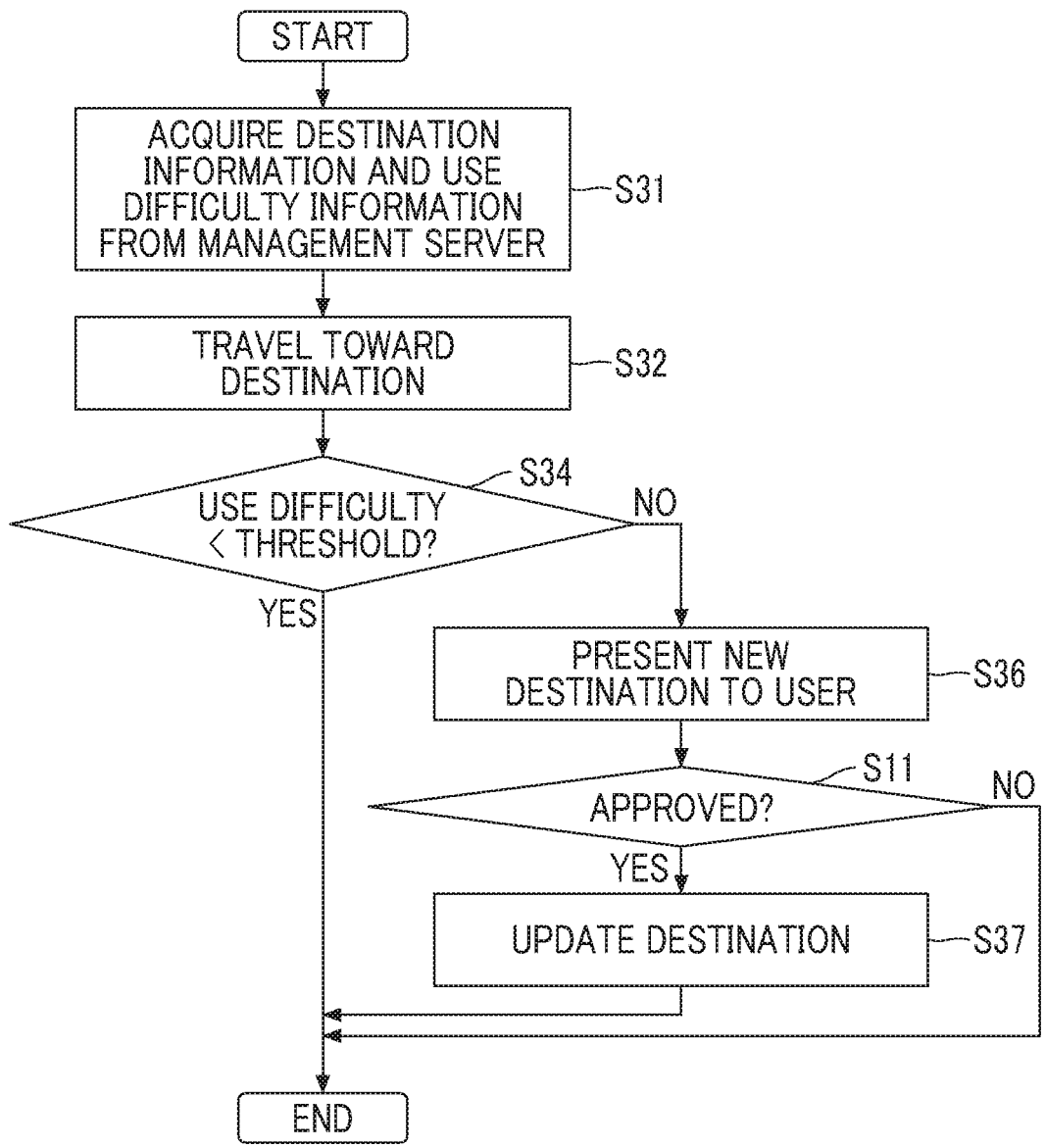
FIG. 12 is a flowchart showing a fifth processing example in a driverless transportation system according to the embodiment.

FIG. 12 is a flowchart showing a fifth processing example. The management server 20 sends information of the second destination DE2 and the use difficulty information AVA corresponding to the second destination DE2 to the second autonomous driving vehicle 30-2 in response to reception of the vehicle allocation request.

The control device 100 of the second autonomous driving vehicle 30-2 acquires information of the second destination DE2 and the use difficulty information AVA corresponding to the second destination DE2 from the management server 20 through the communication device 40 (Step S31). The control device 100 performs control such that the traveling device 90 allows the second autonomous driving vehicle 30-2 to travel toward the second destination DE2 (Step S32).

The control device 100 determines whether or not the use difficulty is lower than the threshold (Step S34).

In a case where the use difficulty is lower than the threshold (Step S34; Yes), the control device 100 allows the second autonomous driving vehicle 30-2 to travel toward the second destination DE2 as it is.

In a case where the use difficulty is equal to or higher than the threshold (Step S34; No), the control device 100 proposes changing the destination of the second autonomous driving vehicle 30-2 to the second user. Specifically, the control device 100 presents the third destination DE3 as a new destination to the second user (Step S36). For example, the control device 100 sends notification for proposing changing to the third destination DE3 to the user terminal 10 through the communication device 40. The control device 100 may send the notification to the management server 20 through the communication device 40, and the management server 20 may transfer the notification to the user terminal 10 of the second user.

The second user approves or disapproves the presented third destination DE3 using the user terminal 10 of the second user (Step S11). Information of approval or disapproval is sent from the user terminal 10 to the second autonomous driving vehicle 30-2 through communication or is sent from the second autonomous driving vehicle 30-2 through the management server 20.

In a case where the second user approves the third destination DE3 (Step S11; Yes), the control device 100 of the second autonomous driving vehicle 30-2 updates the destination to the third destination DE3 (Step S37). As a result, the second autonomous driving vehicle 30-2 travels toward the third destination DE3 after update.

In a case where the second user disapproves the third destination DE3 (Step S11; No), the control device 100 maintains the destination as it is without updating the destination. The second autonomous driving vehicle 30-2 travels toward the second destination DE2 as it is.

According to the above-described fifth processing example, the second autonomous driving vehicle 30-2 determines the use difficulty, instead of the management server 20. Since processing is distributed, a calculation load imposed on the management server 20 is reduced.

5-6. Sixth Processing Example

In a sixth processing example, a situation in which the first autonomous driving vehicle 30-1 is yet near the first destination DE1 (that is, the second destination DE2) is considered (see FIG. 5). In this case, the second autonomous driving vehicle 30-2 can directly acquire the use difficulty information AVA from the first autonomous driving vehicle 30-1 through vehicle-to-vehicle communication (V2V communication).

Figure 13:
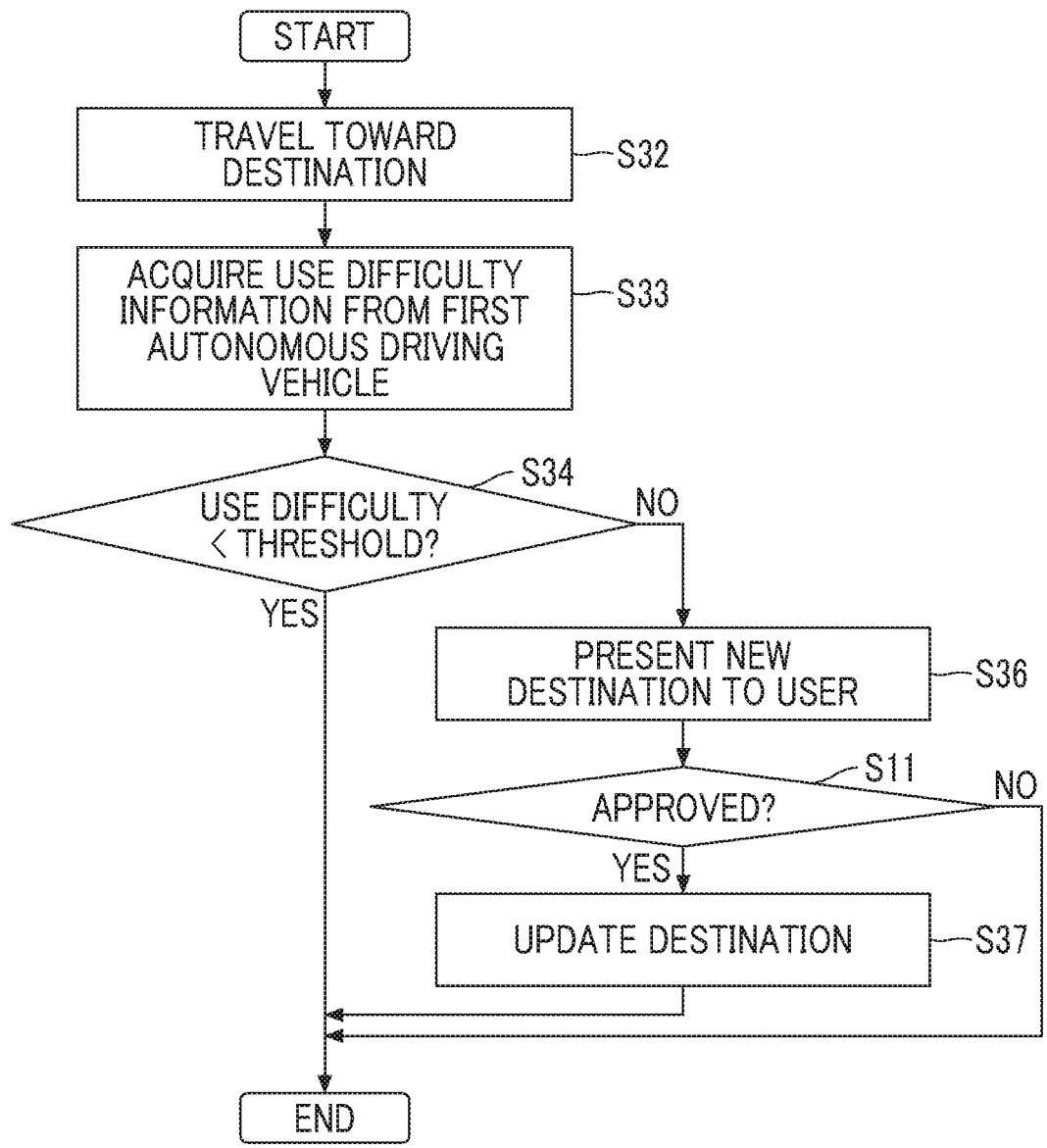
FIG. 13 is a flowchart showing a sixth processing example in a driverless transportation system according to the embodiment.

FIG. 13 is a flowchart showing the sixth processing example. Step S32 is the same as in the above-described fifth processing example. That is, the control device 100 of the second autonomous driving vehicle 30-2 allows the second autonomous driving vehicle 30-2 to travel toward the second destination DE2 (Step S32). Thereafter, the second autonomous driving vehicle 30-2 approaches to a distance capable of performing V2V communication with the first autonomous driving vehicle 30-1.

In a case where the first autonomous driving vehicle 30-1 already acquires the use difficulty information AVA, the control device 100 performs V2V communication using the communication device 40 and acquires the use difficulty information AVA from the first autonomous driving vehicle 30-1. With this, it is possible to recognize the present use difficulty substantially in real time. Subsequent processing (Steps S34 to S37) is the same as in the fifth processing example.

The sixth processing example can be combined with the above-described first to fifth processing examples. That is, the use difficulty information AVA stored in the management server 20 may be used at a position distant from the second destination DE2, and the latest use difficulty information AVA provided from the first autonomous driving vehicle 30-1 may be used when the second destination DE2 is approached.

5-7. Seventh Processing Example

In a seventh processing example, a case where the second user gets off is considered (see FIG. 6). In a case where the second user gets in the second autonomous driving vehicle 30-2, the second user sends the desired getting-off position to the second autonomous driving vehicle 30-2. For example, the second user transmits information of the getting-off position to the second autonomous driving vehicle 30-2 using the user terminal 10 of the second user. The second user inputs information of the getting-off position using the HMI unit 80 of the second autonomous driving vehicle 30-2. The getting-off position desired by the second user is the second destination DE2.

Figure 14:
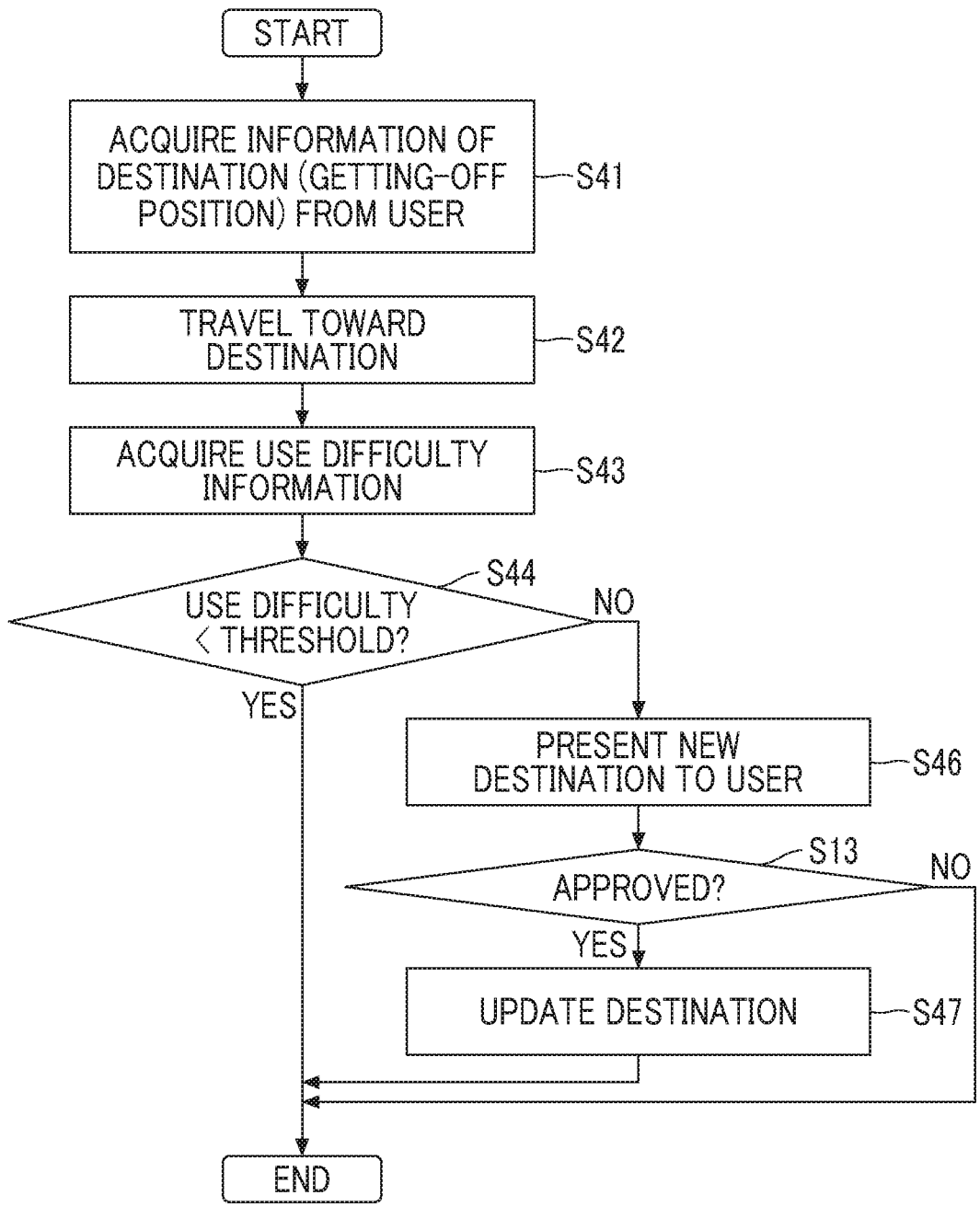
FIG. 14 is a flowchart showing a seventh processing example in a driverless transportation system according to the embodiment.

FIG. 14 is a flowchart showing the seventh processing example. The control device 100 of the second autonomous driving vehicle 30-2 acquires information of the second destination DE2 (getting-off position) from the second user (Step S41). The control device 100 performs control such that the traveling device 90 allows the second autonomous driving vehicle 30-2 to travel toward the second destination DE2 (Step S42).

The control device 100 acquires the use difficulty information AVA corresponding to the second destination DE2 from the management server 20 through the communication device 40 (Step S43). Then, the control device 100 determines whether or not the use difficulty is lower than the threshold (Step S44).

In a case where the use difficulty is lower than the threshold (Step S44; Yes), the control device 100 allows the second autonomous driving vehicle 30-2 to travel toward the second destination DE2 as it is.

In a case where the use difficulty is equal to or higher than the threshold (Step S44; No), the control device 100 proposes changing the destination to the second user. Specifically, the control device 100 presents the third destination DE3 as a new destination to the second user (Step S46). For example, the control device 100 sends notification for proposing changing to the third destination DE3 to the user terminal 10 through the communication device 40. The control device 100 may directly propose changing to the third destination DE3 to the second user using the HMI unit 80.

The second user approves or disapproves the presented third destination DE3 using the user terminal 10 of the second user or the HMI unit 80 (Step S13). Information of approval or disapproval is sent from the user terminal 10 to the second autonomous driving vehicle 30-2 through communication or is input through the HMI unit 80.

In a case where the second user approves the third destination DE3 (Step S13; Yes), the control device 100 of the second autonomous driving vehicle 30-2 updates the destination to the third destination (Step S47). As a result, the second autonomous driving vehicle 30-2 travels toward the third destination DE3 after update.

In a case where the second user disapproves the third destination DE3 (Step S13; No), the control device 100 maintains the destination as it is without updating the destination. The second autonomous driving vehicle 30-2 travels toward the second destination DE2 as it is.

The use difficulty may be determined by the management server 20. In this case, in Step S43, the control device 100 of the second autonomous driving vehicle 30-2 sends information of the second destination DE2 acquired from the second user to the management server 20, and the management server 20 reads the use difficulty information AVA corresponding to the second destination DE2 from the storage device. In Step S44, the management server 20 determines whether or not the use difficulty is lower than the threshold. In Step S46, the management server 20 presents the third destination DE3 to the second user. In Step S47, the management server 20 updates the destination and sends information of the third destination DE3 after update to the second autonomous driving vehicle 30-2. The control device 100 of the second autonomous driving vehicle 30-2 allows the second autonomous driving vehicle 30-2 to travel toward the third destination DE3 after update.

5-8. Eighth Processing Example

Figure 15:
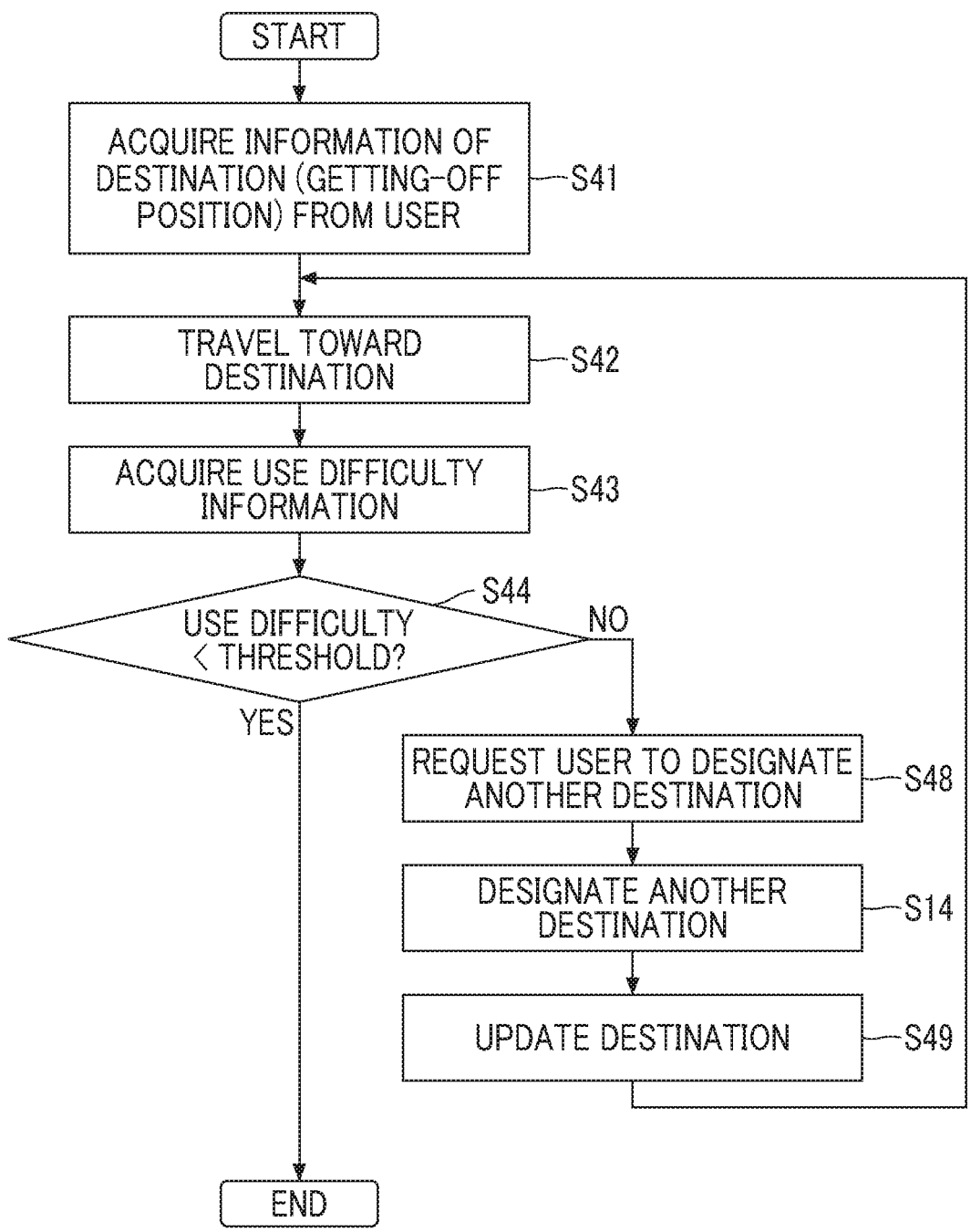
FIG. 15 is a flowchart showing an eighth processing example in a driverless transportation system according to the embodiment.

FIG. 15 is a flowchart showing an eighth processing example. The eighth processing example is a modification of the seventh processing example. Steps S41 to S44 are the same as in the seventh processing example. In determination of Step S44, in a case where the use difficulty is equal to or higher than the threshold (Step S44; No), the one of the management server and the second autonomous driving vehicle proposes changing the destination to the second user.

In the eighth processing example, the one of the management server and the second autonomous driving vehicle requests the user to designate the third destination DE3 as another destination (Step S48). The second user designates the third destination DE3 using the user terminal 10 of the second user or the HMI unit 80 (Step S14). Information of the third destination DE3 designated by the second user is sent from the user terminal 10 to the second autonomous driving vehicle 30-2 through communication or is input through the HMI unit 80. The one of the management server and the second autonomous driving vehicle updates the destination of the second autonomous driving vehicle 30-2 to the third destination DE3 designated by the second user (Step S49). Thereafter, the process returns to Step S42.

According to the eighth processing example described above, the preference of the second user is easily reflected in the destination.

6. Determination of Charging Start Timing

In the driverless transportation service, it is supposed that the autonomous driving vehicle 30 that arrives at the pickup position desired by the user is left as it is. In order to inhibit the occurrence of the above-described situation, a timing at which charging is started to the user who sends the vehicle allocation request is considered. For example, a charging start timing is when a standby period T has elapsed after the autonomous driving vehicle 30 is stopped at the pickup position desired by the user.

As in the embodiment of the disclosure, in a case where the pickup position (destination) desired by the user is changed from the original desired position, the user needs to move from the pickup position before change to the pickup position after change. A time needed for movement described above should be taken into consideration in determination of the charging start timing. Accordingly, in a case where the pickup position (destination) desired by the user is changed, the autonomous driving vehicle 30 or the management server 20 delays the charging start timing to the user. For example, the autonomous driving vehicle 30 or the management server 20 delays the standby period T by a time needed until the user moves from the pickup position before change to the pickup position after change. With this, fairness about charging is obtained.

Although the embodiment of the disclosure has been described above in detail, the disclosure is not limited to the above-described embodiment, and various modifications or alterations may be made without departing from the spirit and scope of the disclosure described in the claims.

What is claimed is:

1. A driverless transportation system that provides a driverless transportation service, the driverless transportation system comprising:
    a management server; and
    a plurality of autonomous driving vehicles configured to perform communication with the management server, the autonomous driving vehicles including a first autonomous driving vehicle and a second autonomous driving vehicle,
    the first autonomous driving vehicle being an autonomous driving vehicle that accesses a first destination to pick up a first user or to allow the first user to get off, the first autonomous driving vehicle being configured to generate use difficulty information on a use difficulty of the first destination in association with the first destination, wherein the use difficulty is calculated based on any one of i) a time needed for the pickup or getting-off of the first user, ii) a redoing frequency of processing for picking up the first user or allowing the first user to get off, and iii) a result of localization, the first autonomous driving vehicle being configured to send the use difficulty information to the management server,
    the second autonomous driving vehicle being an autonomous driving vehicle that accesses a second destination identical to the first destination or near the first destination to pick up a second user or to allow the second user to get off,
    the management server being configured to store the use difficulty information,
    one of the management server and the second autonomous driving vehicle being configured to acquire the use difficulty information from one of the management server and the first autonomous driving vehicle, when the second autonomous driving vehicle accesses the second destination after the first autonomous driving vehicle has accessed the first destination, and
    the one of the management server and the second autonomous driving vehicle being configured to propose changing a destination of the second autonomous driving vehicle to the second user when the use difficulty is equal to or higher than a threshold.

2. The driverless transportation system according to claim 1, wherein the second autonomous driving vehicle is configured to travel toward a third destination when the destination of the second autonomous driving vehicle is changed from the second destination to the third destination.

3. The driverless transportation system according to claim 2, wherein the second autonomous driving vehicle is configured to start traveling toward the second destination before the destination of the second autonomous driving vehicle is changed.

4. The driverless transportation system according to claim 1, wherein the one of the second autonomous driving vehicle and the management server is configured to delay a timing of starting charging to the second user in a case where the destination of the second autonomous driving vehicle is changed when the second autonomous driving vehicle picks up the second use.

* * * * *